United States Patent [19]

Hanyu et al.

[11] Patent Number: 4,932,757
[45] Date of Patent: Jun. 12, 1990

[54] FERROELECTRIC LIQUID CRYSTAL DEVICE

[75] Inventors: Yukio Hanyu, Atsugi; Yutaka Inaba, Kawaguchi; Akira Tsuboyama, Sagamihara; Akio Yoshida, Chigasaki, all of Japan

[73] Assignee: Canon Kabushiki Kaisha, Tokyo, Japan

[21] Appl. No.: 232,765

[22] Filed: Aug. 16, 1988

[30] Foreign Application Priority Data

Aug. 19, 1987 [JP] Japan .................. 62-206651

[51] Int. Cl.$^5$ .................................... G02F 1/133
[52] U.S. Cl. ........................ 350/339 R; 350/341; 350/350 S
[58] Field of Search .............. 350/339 R, 350 S, 341

[56] References Cited

U.S. PATENT DOCUMENTS

| | | | |
|---|---|---|---|
| 4,367,924 | 1/1983 | Clark et al. | 350/350 S |
| 4,563,059 | 1/1986 | Clark et al. | 350/350 S |
| 4,615,586 | 10/1986 | Geary et al. | 350/350 S |
| 4,681,404 | 7/1987 | Okada et al. | 350/350 S |
| 4,693,951 | 9/1987 | Takasu et al. | 346/74.2 |
| 4,715,686 | 12/1987 | Iwashita et al. | 350/339 R |
| 4,738,515 | 4/1988 | Okada et al. | 350/350 S |

FOREIGN PATENT DOCUMENTS 0172621 10/1983 Japan .................. 350/339 R

OTHER PUBLICATIONS

N. A. Clark, et al., "Ferroelectric Liquid Crystal Electrooptics Using the Surface Stabilized Structure," Mol. Cryst. 1983, vol. 9, pp. 213–214.

Yoshino, et al., "Ferroelectric Behavior of Smectic Liquid Crystal," Japanese Journal of Applied Physics, vol. 16, No. 14, Apr. 1, 1977 pp. 571–574.

Miyasato, et al., "Direct Method with Triangular Waves for Measuring Spontaneous Polarization in Ferroelectric Liquid Crystals", Japanese Journal of Applied Physics, vol. 229(10), pp. 661–663 (1983).

Fink and Caroll, Standard Handbook For Electrical Engineers, 10th Edition, McGraw Hill.

*Primary Examiner*—Stanley D. Miller
*Assistant Examiner*—Anita Pellman Gross
*Attorney, Agent, or Firm*—Fitzpatrick, Cella, Harper & Scinto

[57] ABSTRACT

A ferroelectric liquid crystal device comprises a pair of substrates each provided with an electrode, and a ferroelectric liquid crystal disposed between the pair of substrates. At least one of the pair of substrates has thereon an inorganic oxide layer which has a resistance of $1$–$10^5$ $\Omega/cm^2$ in the direction of the layer thickness and preferably has a pencil hardness of 4H or harder. Because of the provision of the inorganic oxide layer, the ferroelectric liquid crystal device shows good bistability on switching under application of pulse electric fields and yet free of short circuit between the upper and lower electrodes.

13 Claims, 1 Drawing Sheet

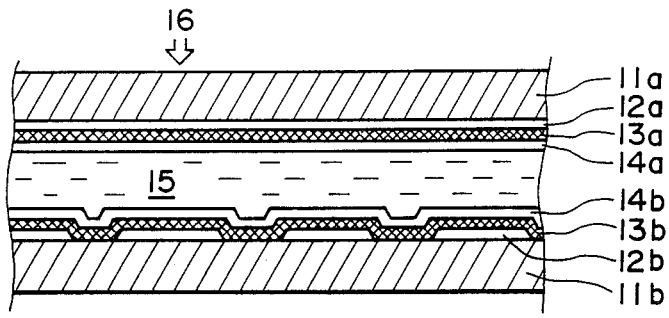
F I G. 1
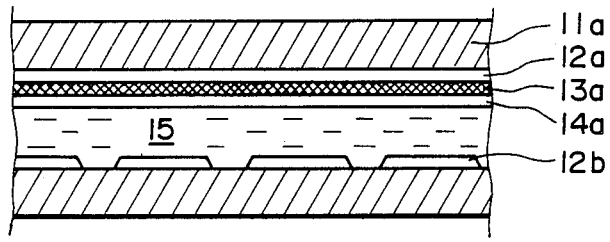
F I G. 2
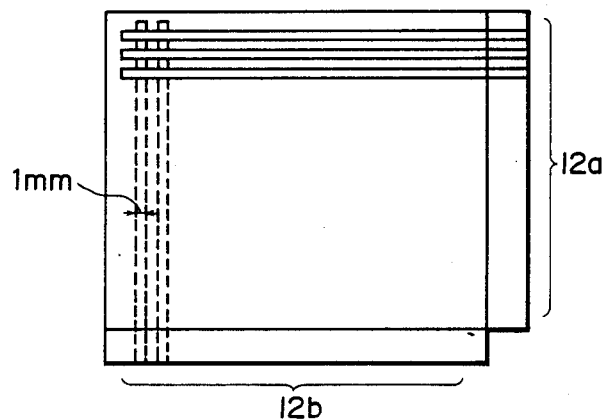
F I G. 3

FERROELECTRIC LIQUID CRYSTAL DEVICE

FIELD OF THE INVENTION AND RELATED ART

The present invention relates to a liquid crystal device for use in a liquid crystal device or a liquid crystal-optical shutter, etc., particularly a liquid crystal device using a ferroelectric liquid crystal, more particularly to a liquid crystal device with optimal display characteristics through improvement in dynamic characteristic under application of a pulse electric field.

A display device of the type which controls transmission of light in combination with a polarizing device by utilizing the refractive index anisotropy of ferroelectric liquid crystal molecules has been disclosed by U.S. Pat. No. 4,367,924 to N. A. Clark, et al.; U.S. Pat. No. 4,639,089 to S. Okada, et al.; etc. The ferroelectric liquid crystal has generally chiral smectic C phase (SmC*) or H phase (SmH*) and, under this state, shows a property of taking either one of a first optically stable state and a second optically stable state responding to an electrical field applied and maintaining such state in the absence of an electrical field, namely bistability, and also has a rapid response to the change in electrical field. Thus, it is expected to be utilized in a high speed and memory type display device.

For an optical modulation device by use of a liquid crystal having such bistability to exhibit desirable driving characteristics, it is required that the liquid crystal arranged between a pair of substrates should be in such a state that conversion between the above two stable states may occur effectively without regarding the application of an electrical field.

Incidentally, a conventional TN-liquid crystal device has such a cell structure that the liquid crystal is disposed in a cell gap (layer thickness) of about 20 microns between alignment control films formed on transparent electrodes. In contrast thereto, a ferroelectric liquid crystal device is required to have a cell gap of 1-4 microns in order to show a characteristic bistable orientation state when subjected to switching under application of a pulse electric field. However, a cell structure as described above having only an alignment film on transparent electrodes is liable to cause a short circuit between the upper and lower electrodes at a cell gap of 1-4 microns. Thus, it has been particularly difficult to prepare a liquid crystal device having a cell gap of 2.5 microns or less which is free of short circuit between the upper and lower electrodes.

Therefore, a ferroelectric liquid crystal device was prepared by using a cell structure wherein an $SiO_2$ film formed by sputtering was inserted as a short circuit-preventing layer between an alignment control layer and an electrode. It has been found through our experiments, however, that it is difficult to realize the above-mentioned "bistability" under application of pulse electric fields exceeding the threshold according to such a structure as described above including an $SiO_2$ film having a high resistivity of $5 \times 10^5$ $\Omega/cm^2$ or above in the direction of the film thickness. According to our experiments, it has been particularly found that a ferroelectric liquid crystal having a large spontaneous polarization of, e.g., $15 \times 10^{-8}$ coulomb/$cm^2$ or above, tends to exhibit unistability rather than bistability.

SUMMARY OF THE INVENTION

An object of the present invention is to solve the above-mentioned problem, i.e., to provide a ferroelectric liquid crystal device showing a good bistability characteristics in response to switching by pulse electric fields and yet free of short circuit between the upper and lower electrodes.

Through a large number of experiments of ours, we have been able to provide a ferroelectric liquid crystal device showing a good bistability (i.e., little uni-stability) by using as a short circuit-preventing layer an inorganic oxide layer having a low resistivity, particularly a resistance of 1 to $10^5$ $\Omega/cm^2$ in the direction of the layer thickness and, preferably, a pencil hardness of 4H or harder.

More specifically, according the present invention, there is provided, in a ferroelectric liquid crystal device comprising a pair of substrates each provided with an electrode and a ferroelectric liquid crystal disposed between the pair of substrates, an improvement wherein at least one of said pair of substrates has thereon an inorganic oxide layer having a resistance of 1-$10^5$ $\Omega/cm^2$ in the direction of the layer thickness.

These and other objects, features and advantages of the present invention will become more apparent upon a consideration of the following description of the preferred embodiments of the present invention taken in conjunction with the accompanying drawings.

BRIEF DESCRIPTION OF THE DRAWING

FIG. 1 is a schematic sectional view of an embodiment of the ferroelectric liquid crystal device according to the present invention;

FIG. 2 is a sectional view of another embodiment of the ferroelectric liquid crystal device according to the present invention; and FIG. 3 is a schematic plan view for explaining an arrangement of electrodes used in the present invention.

DESCRIPTION OF THE PREFERRED EMBODIMENTS

FIG. 1 is a schematic sectional view showing an embodiment of the ferroelectric liquid crystal device of the present invention. The liquid crystal device shown in FIG. 1 has a pair of substrates, i.e., an upper substrate 11a and a lower substrate 11b, and transparent electrodes 12a and 12b comprising $In_2O_3$ or ITO (indium tin oxide) disposed on the respective substrates. The transparent electrodes 12a and 12b are further coated with short circuit-preventing layers 13a and 13b, respectively, and alignment control layers 14a and 14b, respectively. Each of the short circuit-preventing layers 13a and 13b has a resistance of 1-$10^5$ $\Omega/cm^2$ in the direction the layer thickness thereof and a pencil hardness of 4H or harder. Each of the alignment control layers 14a and 14b has a thickness of 400 Å or less or a resistivity of $10^{14}$-$10^5$ $\Omega \cdot cm$. In the present invention, the short circuit-preventing layer and the alignment control layer can be prepared on both substrates or on either one of the substrates as shown in FIG. 2.

The short circuit-preventing layer prevents the occurrence of short circuit caused by entrainment of an electrically conductive foreign matter in the cell. More specifically, the short circuit is caused by contact of such a conductive foreign matter with both the upper and lower electrodes. For this reason, the short circuit-preventing layer should desirably be hard enough to prevent the breakage thereof by such a foreign matter. As a result of our experiments, it has been found effective that the short circuit-preventing layer has a pencil hardness of 4H or harder.

Further, the short circuit-preventing layer should have a resistance of $1-10^5\Omega$, preferably $1-10^4\Omega$, per unit area of 1 cm$^2$ in the direction of the layer thickness. More specifically, it has been found that a resistance exceeding $10^5\Omega/cm^2$ in the layer thickness direction results in a lower bistability and a lower display contrast, and a resistance below 1 $\Omega/cm^2$ rather promotes the occurrence of short circuit.

On the other hand, with respect to the alignment control layer 14a or 14b, the thickness thereof can be increased to above 500 Å by lowering the resistivity thereof to below $10^5\Omega.cm$, or the resistivity thereof can be higher by decreasing the thickness slightly, so that the good ferroelectric liquid crystal device desired by the present invention can be obtained insofar as the characteristic short circuit-preventing layer is adversely affected thereby.

The alignment control layer may for example be formed from polyvinyl alcohol, polyamide, cellulose, polyamide-imide, polyimide, polyester, epoxy resin, etc.

Examples of the ferroelectric liquid crystal used in the present invention may include p-decyloxybenzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acid-bis(2-methylbutyl) ester, 4-O-(2-methyl)butylresorcylidene-4'-octylaniline, 4-(2'-methylbutyl)phenyl-4'-octyloxybiphenyl-4-carboxylate, 4-hexyloxyphenyl-4-(2''-methylbutyl)-biphenyl-4'-carboxylate, 4-octyloxyphenyl-4-(2'''-methylbutyl)biphenyl-4'-carboxylate, 4-heptylphenyl-4-(4''-methylhexyl)biphenyl-4'-carboxylate, 4-(2''-methylbutyl)phenyl-4-(4''-methylhexyl)biphenyl-4'-carboxylate, etc. These can be used either alone or as a combination of two or more kinds, and it is also possible to incorporate other cholesteric liquid crystals or smectic liquid crystals within the range exhibiting ferroelectricity.

In addition to the liquid crystals described above, those described in U.S. Pat. Nos. 4,622,165, 4,614,609, 4,596,667, 4,592,858, 4,556,727 and 4,576,732 can also be used in the present invention. In the present invention, the ferroelectric liquid crystal may be used in a chiral smectic phase, typically chiral smectic C phase (SmC*), H phase (SmH*), I phase (SmI*), K phase (SmK*) or G phase (SmG*).

The cell gap (liquid crystal layer thickness) used in the present invention may be 0.5-4 μm, preferably 1-2.5 μm.

The electrodes 12a and 12b may for example be arranged in the form of a matrix as shown in FIG. 3 which is a schematic plan view as viewed from the direction of an arrow 16 shown in FIG. 1.

Hereinbelow, the present invention will be explained by way of representative Examples and Comparative Examples.

EXAMPLE 1

Two glass plates of 1.1 mm in thickness were provided, and each glass plate was provided with an ITO film having an area of 1 cm$^2$. Then, each glass plate was further coated with a 5 wt. % solution of acetylacetonatotin (II) in butanol by means of a spinner rotating at 3000 rpm for 30 seconds, and then subjected to calcination under heating at 300° C. to form an about 1000 Å-thick tin oxide film.

One of the thus-treated two glass plates was subjected to measurement of a pencil hardness according to Japanese Industrial Standards (JIS) K-5401-1969, whereby the calcined SnO$_2$ film showed a pencil hardness of 5H.

Then, on the tin oxide film of the other coated glass plate, an aluminum electrode in an area of 1 cm$^2$ was formed by vapor deposition so as to be in alignment with the ITO electrode of 1 cm$^2$. The resistance of the tin oxide film between the aluminum electrode and the ITO electrode was measured by means of a 4192A-LF-IMPEDANCE ANALYZER (mfd. by Yokogawa Hewlett Packard K.K.) at an AC frequency of 20 KHz.

The above-prepared aluminum electrode was further coated with a 0.8% aqueous solution of polyvinyl alcohol by means of a spinner rotating at 3000 rpm for 30 seconds, followed by heat curing at 180° C. for about 1 hour to form an about 90 Å-thick film. Then, an aluminum in an area of 1 cm$^2$ was formed in the same manner as above so as to be in alignment with the above-prepared aluminum electrode. The resistance R ($\Omega$) of the polyvinyl alcohol film between the aluminum electrodes were measured by means of the 4192A-LF-IMPEDANCE ANALYZER, and the resistivity P ($\Omega.cm$) of the film was calculated by substituting the R value into the following equation:

$$P(\Omega \cdot cm) = \frac{R(\Omega) \times S(cm^2)}{d(cm)},$$

wherein S is the common area of the aluminum electrodes and d is the thickness of the film. As a result, the polyvinyl alcohol film was found to have a resistivity of $10^9\Omega.cm$.

Separately, two additional glass plates were provided, each of which however had thereon ten stripe electrodes 12a or 12b of ITO each having a width of 1 mm as shown in FIG. 3. The two additional glass plates were each coated with the SnO$_2$ film and further coated with an about 90 Å-thick polyvinyl alcohol film in the above-described manner, followed further by rubbing with an acetate fiber-planted cloth, washing with isopropyl alcohol, and drying at 120° C. for 20 minutes. On one of the thus-treated two glass plates each having stripe ITO electrodes and coated with the SnO$_2$ film and the polyvinyl alcohol film, alumina beads having an average particle size of about 1 μm were dispersed, and the other plate was superposed thereon and fixed thereto so that the rubbing axes provided to the two plates were parallel to each other to form a blank cell.

The cell thickness of the cell was measured by means of Berek compensator (i.e., measurement by phase difference) to be about 1 μm. After injection under vacuum of an ester-type ferroelectric liquid crystal mixture ("CS-1011" (trade name) produced by Chisso K.K.) into the cell under isotropic phase, the ferroelectric liquid crystal could be aligned by cooling gradually from isotropic phase to 25° C. at a rate of 0.5° C./h. Experiments were thereafter conducted at 25° C.

The phase transition characteristics of "CS-1011" as mentioned above were as follows.

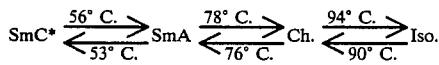

(SmA: smectic A phase, Ch.: cholesteric phase, Iso.: isotropic phase).

The liquid crystal "CS-1011" further showed a spontaneous polarization of $21 \times 10^{-8}$ coulomb/cm$^2$ (at room temperature) as measured by a method described in "Direct Method with Triangular Waves for Measuring Spontaneous Polarization in Ferroelectric Liquid Crystal" by K. Miyasato, et al., in Japanese Journal of Applied Physics, Vol. 22(10), p. 661-663 (1983). In the present invention, it is possible to use a ferroelectric liquid crystal having a large spontaneous polarization of generally $15 \times 10^{-8}$ coulomb/cm$^2$ or more, preferably of $20 \times 10^{-8}$ coulomb/cm$^2$ or more, effective for providing a higher response speed.

When the above-prepared cell was observed under crossed nicols, a monodomain of a chiral smectic C phase with a uniform and defect-free non-helical structure was found to be obtained.

Then, the cell was supplied with a pulse electric field having a voltage of 25 V and a pulse duration of 50 μsec to uniformly orient the liquid crystal molecules to one stable state and then supplied with a pulse electric field of the reverse polarity having a voltage of −25 V and a pulse duration of 50 μsec to orient the liquid crystal molecules to the other stable state. In this way, the percentage of areal inversion per unit pixel area of 1 mm$^2$ was measured as a measure of bistability, whereby the value of 96% was obtained on application of both 25 V pulse and −25 V pulse, thus showing a good bistability.

Further, the cell was examined with respect to short circuit between the upper and lower electrodes, whereby all of the 100 pixels each having an area of 1 mm$^2$ showed a resistance of not lower than 2 MΩ, thus showing no occurrence of short circuit.

EXAMPLES 2-5

The procedure of Example 1 was repeated for evaluating the bistability and occurrence of short circuit through measurement of the resistance between upper and lower electrodes of liquid crystal cells except that the liquid crystal cells were prepared by forming alignment control layers and short circuit-preventing layers as shown in the following Table 1. The other conditions were the same as in Example 1.

TABLE 1

| Example | Alingment control layer | Short circuit-preventing layer |
|---|---|---|
| 2 | poylvinyl alcohol thickness: 400 Å resistivity: $10^9$ Ω·cm | SnO$_2$ film formed by sputtering thickness: 1000 Å pencil hardness: 7 H resistance: 10 Ω/cm$^2$ |
| 3 | polyamide thickness: 300 Å resistivity: $10^{12}$ Ω·cm | SnO$_2$ film formed by sputtering thickness: 1000 Å pencil hardness: 7 H resisitance: 10 Ω/cm$^2$ |
| 4 | polyimide thickness: 50 Å resistivity: $10^{16}$ Ω·cm | Sn-Ti oxide layer formed by application of a solution of acetylacetonation (II) and titanium alkoxide, followed by calcination. thickness: 100 Å pencil hardness: 5 H resistance: $10^5$ Ω/cm$^2$ |
| 5 | polyamide-imide thickness: 100 Å resistivity: $10^{13}$ Ω·cm | SnO$_2$ film formed by application of a solution of acetylacetonation (II), followed by calcination. thickness: 800 Å pencil hardness: 5 H resistance: 1 Ω/cm$^2$ |

As a result, all the cells of Examples 2–5 showed a resistance of not lower than 2 MΩ at all of 100 pixels with an area of 1 mm$^2$ thus showing freeness from short circuit and showed good bistability under application of pulse voltages of 25 V and −25 V each having a duration of 50 μsec. More specifically, the respective cells showed the following degrees of bistability (percentages of areal inversion per unit pixel area (1 mm$^2$)).

| Example 2: | 92% |
| Example 3: | 92% |
| Example 4: | 94% |
| Example 5: | 93% |

COMPARATIVE EXAMPLE 1

A liquid crystal device was prepared in the same manner as in Example 1 except that each short circuit-preventing layer was prepared between the electrode and the alignment control layer by sputtering of SiO$_2$ in a thickness of 2500 Å. The SiO$_2$ film showed a resistance of $5 \times 10^5$ Ω/cm$^2$. The thus prepared liquid crystal device was examined with respect to dynamic characteristic (bistability) and freeness from short circuit. As a result, all the pixels of 1 mm$^2$ showed a resistance of not lower than 2 MΩ. However, under the application of pulse voltages of ±25 V each with a duration of 50 μsec, the device showed a degree of bistability of 33%. As a result, switching failure was caused at most part of a 1 mm$^2$ pixel, thus resulting in a display of a low contrast.

COMPARATIVE EXAMPLE 2

A liquid crystal device was prepared in the same manner as in Example 1 except that the alignment control layers were formed directly on the transparent electrodes without short circuit-preventing layers. Then, the device was subjected to measurement of resistance between the upper and lower electrodes. As a result, about 20% of the 100 pixels of 1 mm$^2$ gave a resistance of 2 KΩ or less, thus causing short circuit.

COMPARATIVE EXAMPLE 3

A liquid crystal device was prepared in the same manner as in Example 1 except that each alignment control layer was formed as a polyimide film having a resistivity of $10^{16}$ Ω·cm and a thickness of 600 Å. Then, the device was evaluated in the same manner as in Example 1. As a result, all the 100 pixels of 1 mm$^2$ showed a resistance of not less than 2 MΩ, but the degree of bistability was 42% under application of pulse voltages of ±25 V each with a pulse duration of 50 μsec.

As described above, according to the present invention, there is provided a ferroelectric liquid crystal device showing good bistability on switching under application of pulse electric fields and yet free of short circuit between the upper and lower electrodes.

We claim:

1. In a ferroelectric liquid crystal device comprising a pair of substrated each provided with an electrode on the inner surface thereof, and a ferroelectric liquid crystal disposed between the pair of substrates, the improvement wherein at least one of said pair of substrates has an inorganic oxide layer having a resistance of from $1-10^5$ Ω per unit area of 1 cm$^2$ in the direction of the layer thickness on the inner surface and has an alignment control layer having a thickness of 400 Å or less on the inorganic oxide layer.

2. A device according to claim 1, wherein said inorganic oxide layer shows a pencil hardness of 4H or harder.

3. A device according to claim 1, wherein said inorganic oxide layer has a thickness of 100–3000 Å.

4. A device according to claim 1, wherein said alignment control layer has a thickness of 100 Å or less.

5. A device according to claim 1, wherein said alignment control layer has a resistivity of $10^5-10^{14}$Ω.cm.

6. A device according to claim 1, wherein said inorganic oxide layer has a resistance of $1-10^4$ Ω per unit area of 1 cm$^2$ in the direction of the layer thickness.

7. A device according to claim 1, wherein said inorganic oxide layer has a resistance of $1-10^3$ Ω per unit area of 1 cm$^2$ in the direction of the layer thickness.

8. A device according to claim 1, wherein said inorganic oxide layer comprises at least one species of Sn and Ti.

9. A device according to claim 1, wherein said ferroelectric liquid crystal has a spontaneous polarization of $15 \times 10^{-8}$ coulomb/cm$^2$ or larger.

10. A device according to claim 1, wherein said ferroelectric liquid crystal has a spontaneous polarization of $20 \times 10^{-8}$ coulomb/cm$^2$ or larger.

11. A device according to claim 1, wherein said ferroelectric liquid crystal is disposed in a layer thin enough to suppress the formation of its own helical structure in the absence of an electric field.

12. A device according to claim 11, wherein said ferroelectric liquid crystal is disposed in a thickness of 0.5–4 μm.

13. A device according to claim 11, wherein said ferroelectric liquid crystal is disposed in a thickness of 1–2.5 μm.

* * * * *

UNITED STATES PATENT AND TRADEMARK OFFICE
CERTIFICATE OF CORRECTION

PATENT NO. : 4,932,757
DATED : June 12, 1990
INVENTOR(S) : YUKIO HANYU, ET AL.

It is certified that error appears in the above-identified patent and that said Letters Patent is hereby corrected as shown below:

ON THE TITLE PAGE,
AT [56] REFERENCES CITED

Other Publications, "vol. 9," should read --vol. 94,-- and "vol. 229(10)," should read --vol. 22(10),--.

COLUMN 2

Line 17, "according" should read --according to--.

COLUMN 7

Line 11, "substrated" should read --substrates--.

Signed and Sealed this

Seventh Day of January, 1992

Attest:

HARRY F. MANBECK, JR.

*Attesting Officer*      *Commissioner of Patents and Trademarks*